United States Patent
O'Hara et al.

(10) Patent No.: US 10,518,675 B2
(45) Date of Patent: Dec. 31, 2019

(54) SEAT ASSEMBLY INCLUDING A MODULAR FOAM ARRANGEMENT WITH A VENTING MODULAR SECTION AND METHOD FOR FABRICATING THE SAME

(71) Applicant: Gulfstream Aerospace Corporation, Savannah, GA (US)

(72) Inventors: Timothy O'Hara, Savannah, GA (US); Richard Davies, Savannah, GA (US); Jeramiah Mallette, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 47 days.

(21) Appl. No.: 15/810,499

(22) Filed: Nov. 13, 2017

(65) Prior Publication Data

US 2019/0143857 A1 May 16, 2019

(51) Int. Cl.
*B60N 2/56* (2006.01)
*B60N 2/64* (2006.01)
*B60N 2/68* (2006.01)

(52) U.S. Cl.
CPC .......... *B60N 2/5621* (2013.01); *B60N 2/646* (2013.01); *B60N 2/565* (2013.01); *B60N 2/5642* (2013.01); *B60N 2/5657* (2013.01); *B60N 2/68* (2013.01)

(58) Field of Classification Search
CPC .... B60N 2/5621; B60N 2/5642; B60N 2/565; B60N 2/5657
USPC ............................... 297/180.13, 200, DIG. 1
See application file for complete search history.

(56) References Cited

U.S. PATENT DOCUMENTS

| | | | | |
|---|---|---|---|---|
| 3,612,607 A | * | 10/1971 | Lohr | A47C 7/18 297/451.11 |
| 4,413,857 A | * | 11/1983 | Hayashi | A47C 7/74 297/180.11 |
| 5,543,213 A | * | 8/1996 | Duvenkamp | B60N 2/5866 297/452.58 |
| 5,927,817 A | * | 7/1999 | Ekman | B60N 2/56 297/180.14 |
| 5,934,748 A | * | 8/1999 | Faust | B60N 2/5635 297/180.1 |
| 6,528,002 B1 | * | 3/2003 | Wensel | A47C 27/144 264/299 |
| 6,786,541 B2 | * | 9/2004 | Haupt | B60H 1/00285 297/180.1 |
| 6,817,675 B2 | * | 11/2004 | Buss | B60N 2/5635 297/180.11 |
| 6,848,742 B1 | * | 2/2005 | Aoki | B60N 2/5635 297/180.14 |

(Continued)

*Primary Examiner* — Syed A Islam
(74) *Attorney, Agent, or Firm* — LK Global | Lorenz & Kopf, LLP

(57) ABSTRACT

Seat assemblies and methods for fabricating seat assemblies are provided. In one example, a seat assembly includes a seat frame and a seat cushion that is supported by the seat frame. The seat cushion includes a modular foam arrangement having an interior surface disposed therein. The modular foam arrangement includes a venting modular section in fluid communication with the interior surface. An outer covering at least partially covers the modular foam arrangement. An air movement device is in fluid communication with the venting modular section for advancing air between the interior surface and the air movement device.

19 Claims, 4 Drawing Sheets

(56) References Cited

U.S. PATENT DOCUMENTS

| | | | | |
|---|---|---|---|---|
| 7,918,498 B2 * | 4/2011 | Bajic | ........................ | A47C 7/72 |
| | | | | 297/180.1 |
| 8,172,333 B2 * | 5/2012 | Pudenz | ................ | B60N 2/5825 |
| | | | | 297/452.42 |
| 8,282,164 B2 * | 10/2012 | Galbreath | ............... | A47C 7/748 |
| | | | | 297/188.08 |
| 8,672,411 B2 * | 3/2014 | Gomes | ................. | B60N 2/5635 |
| | | | | 297/180.13 |
| 8,727,434 B2 * | 5/2014 | Sahashi | ................ | B60N 2/5635 |
| | | | | 297/180.13 |
| 8,789,883 B2 * | 7/2014 | Itou | ........................ | B29C 33/10 |
| | | | | 297/180.1 |
| 2007/0241604 A1 * | 10/2007 | Saitou | ................. | B60N 2/5621 |
| | | | | 297/452.26 |
| 2008/0166524 A1 * | 7/2008 | Skaja | ........................ | B32B 3/12 |
| | | | | 428/166 |
| 2013/0097777 A1 * | 4/2013 | Marquette | ................ | A47C 7/74 |
| | | | | 5/423 |
| 2016/0096460 A1 * | 4/2016 | Storgato | ............... | B60N 2/5657 |
| | | | | 297/180.13 |
| 2019/0135145 A1 * | 5/2019 | Zhang | ................ | B60N 2/5621 |

* cited by examiner

SEAT ASSEMBLY INCLUDING A MODULAR FOAM ARRANGEMENT WITH A VENTING MODULAR SECTION AND METHOD FOR FABRICATING THE SAME

TECHNICAL FIELD

The technical field relates generally to seat assemblies, and more particularly, relates to seat assemblies including a seat cushion with a modular foam arrangement that includes a venting modular section for air flow and methods for fabricating such seat assemblies.

BACKGROUND

The commercial and/or military transportation industries, e.g., aircraft industry, motor vehicle industry, and the like, often include seat assemblies in the aircraft or motor vehicle for comfortably transporting an occupant(s). The seat assemblies include, for example, a seat frame that supports a plurality of seat cushions, such as a seat base cushion and a seat backrest cushion, for providing comfortable seating for an occupant.

During use of a seat assembly by a seat occupant, an increase in temperature can occur between the seat occupant and one or more of the seat cushions. This increase in temperature can cause the seat cushion(s) to become uncomfortably warm for the seat occupant.

In particular, seat cushions are typically formed from one or more pieces of foam that are hand cut to shape. For example, the seat base cushion can be formed from a single piece of foam that may be subsequently trimmed as needed. Unfortunately, foam is generally a relatively good insulator (e.g., relatively poor conductor of heat) and heat transfer through a single piece of foam away from the seat occupant is minimal, which can cause the seat cushion to become uncomfortably warm especially after prolonged continuous use by the seat occupant.

In another example, the seat base cushion may be formed from multiple hand cut pieces of foam that are glued or bonded together with an adhesive. Unfortunately, in addition to the multiple pieces of foam being relatively poor conductors of heat, the adhesive can further retard heat transfer throughout the foam structure, causing the seat cushion to become uncomfortably warm.

Accordingly, it is desirable to provide improved seat assemblies including a seat cushion that overcomes one or more of the foregoing concerns. Furthermore, other desirable features and characteristics of the various embodiments described herein will become apparent from the subsequent detailed description and the appended claims, taken in conjunction with the accompanying drawings and this background.

SUMMARY

Seat assemblies and methods for fabricating seat assemblies are provided herein. In accordance with an exemplary embodiment, a seat assembly includes a seat frame and a seat cushion supported by the seat frame. The seat cushion includes a modular foam arrangement having an interior surface disposed therein. The modular foam arrangement includes a venting modular section in fluid communication with the interior surface. An outer covering at least partially covers the modular foam arrangement. An air movement device is in fluid communication with the venting modular section for advancing air between the interior surface and the air movement device.

In another exemplary embodiment, a seat assembly includes a seat base portion having a rearward section and a forward section on a side opposite the rearward section. The seat base portion includes a seat base structure portion and a seat base cushion supported by the seat base structure portion. The seat base cushion includes a modular foam arrangement having an interior surface disposed therein generally forward of the rearward section of the seat base portion. The modular foam arrangement includes a venting modular section in fluid communication with the interior surface. An outer covering at least partially covers the modular foam arrangement. An air movement device is in fluid communication with the venting modular section for advancing air between the interior surface and the air movement device. A seat backrest portion is coupled to the seat base portion and is configured to extend substantially upright from the rearward section of the seat base portion.

In accordance with an exemplary embodiment, a method for fabricating a seat assembly is provided. The method includes arranging a venting modular section in fluid communication with an internal surface in a modular foam arrangement. The modular foam arrangement is at least partially covered with an outer covering for forming a seat cushion. The seat cushion is supported by a seat frame.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to seat assemblies and methods for fabricating seat assemblies. The exemplary embodiments taught herein provide a seat assembly including a seat frame and one or more seat cushions, such as a seat base cushion and/or a seat backrest cushion, supported by the seat frame. The seat cushion includes a modular foam arrangement that has an interior surface disposed therein and a venting modular section that is in fluid communication with the interior surface. In one example, the venting modular section is formed of foam and has a plurality of vents formed therein for allowing air flow through the venting modular section.

In an exemplary embodiment, the modular foam arrangement further includes a plurality of modular foam sections that are coupled together and one or more of which define at least part of the interior surface. In one example, the modular foam sections have a plurality of positive and negative features that function as interlocking features that are correspondingly engaged with each other to couple the modular foam sections together. An outer covering at least partially covers the modular foam arrangement.

An air movement device is in fluid communication with the venting modular section. The air movement device is configured to advance air between the interior surface within the modular foam arrangement and the air movement device for removing heat from the seat cushion. In an exemplary embodiment, it has been found that by using the air movement device to advance air along the interior surface of the modular foam arrangement towards the vented modular section, heat can be efficiently removed from the interior surface by a process of forced air convection to keep the seat cushion from becoming uncomfortably warm for a seat occupant.

Further, in an exemplary embodiment, it has been found that by forming the seat cushion including modular foam sections that are coupled together using interlocking features that are engaged with each other, the use of adhesive to couple the different modular foam sections together can be reduced or eliminated to produce a more comfortable, temperature stable seat cushion for the seat occupant.

Figure 1:
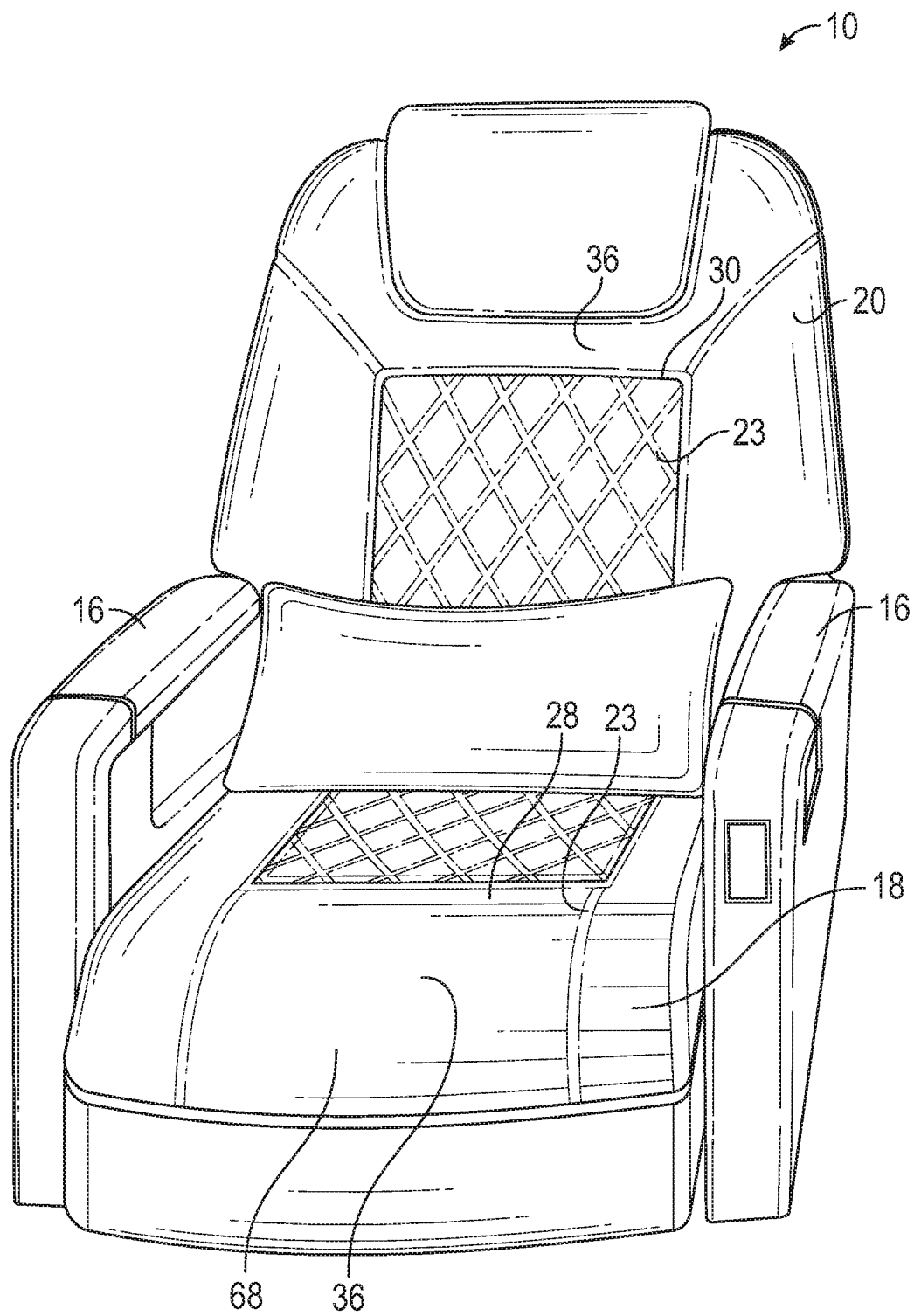
FIG. 1 illustrates a perspective view of a seat assembly in accordance with an exemplary embodiment.
Figure 2:
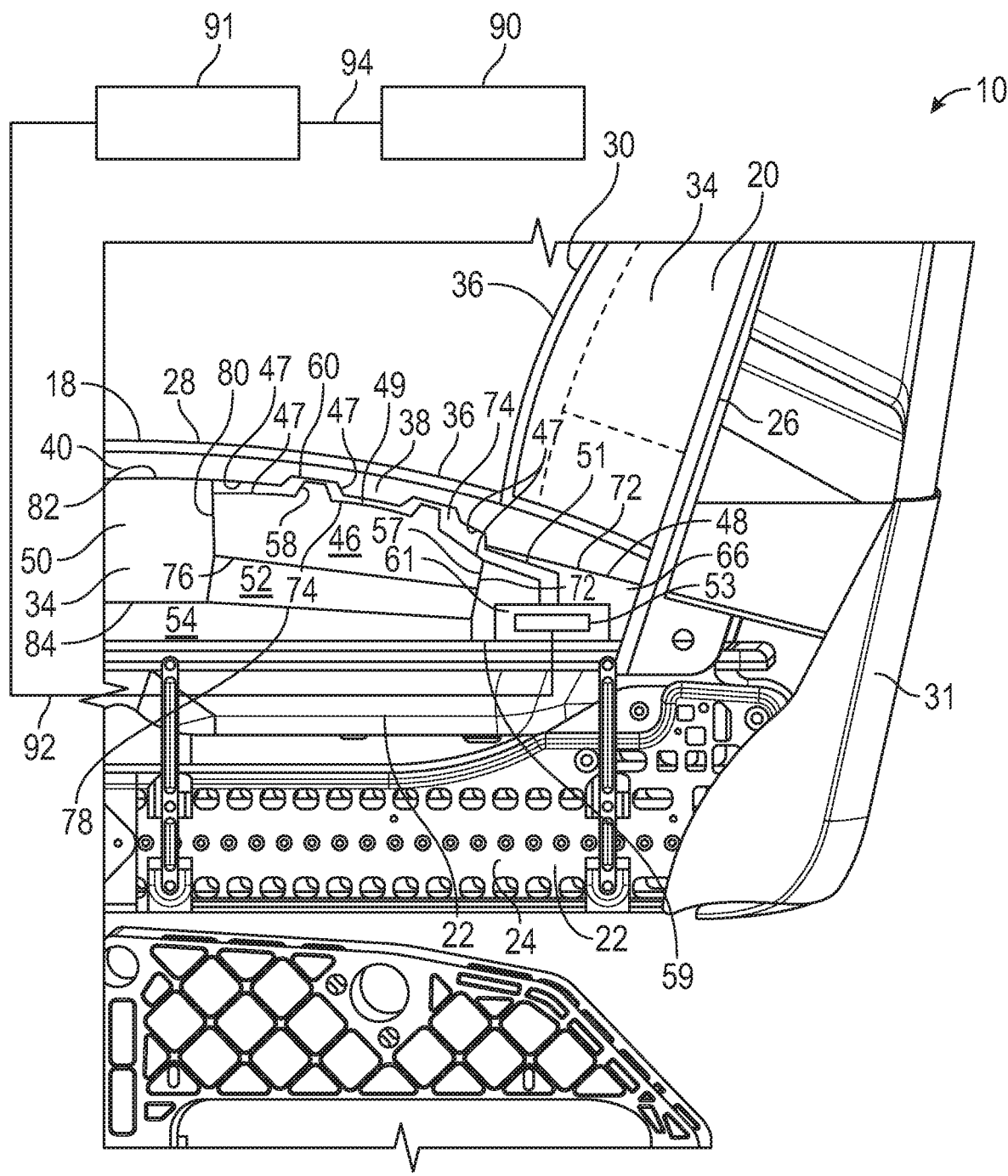
FIG. 2 illustrates a side view of a portion of a seat assembly with a seat frame, a seat base cushion, and a seat backrest cushion in accordance with an exemplary embodiment.
Figure 3:
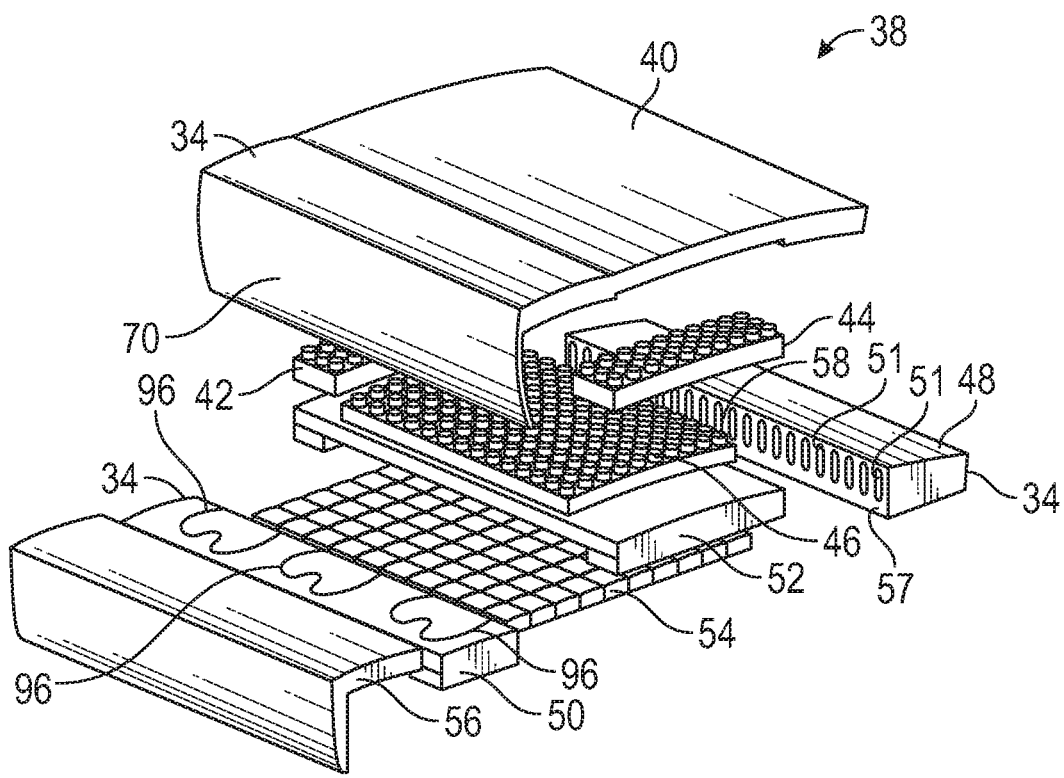
FIG. 3 illustrates an exploded perspective view from above of a modular foam arrangement of a seat cushion in accordance with an exemplary embodiment.
Figure 4:
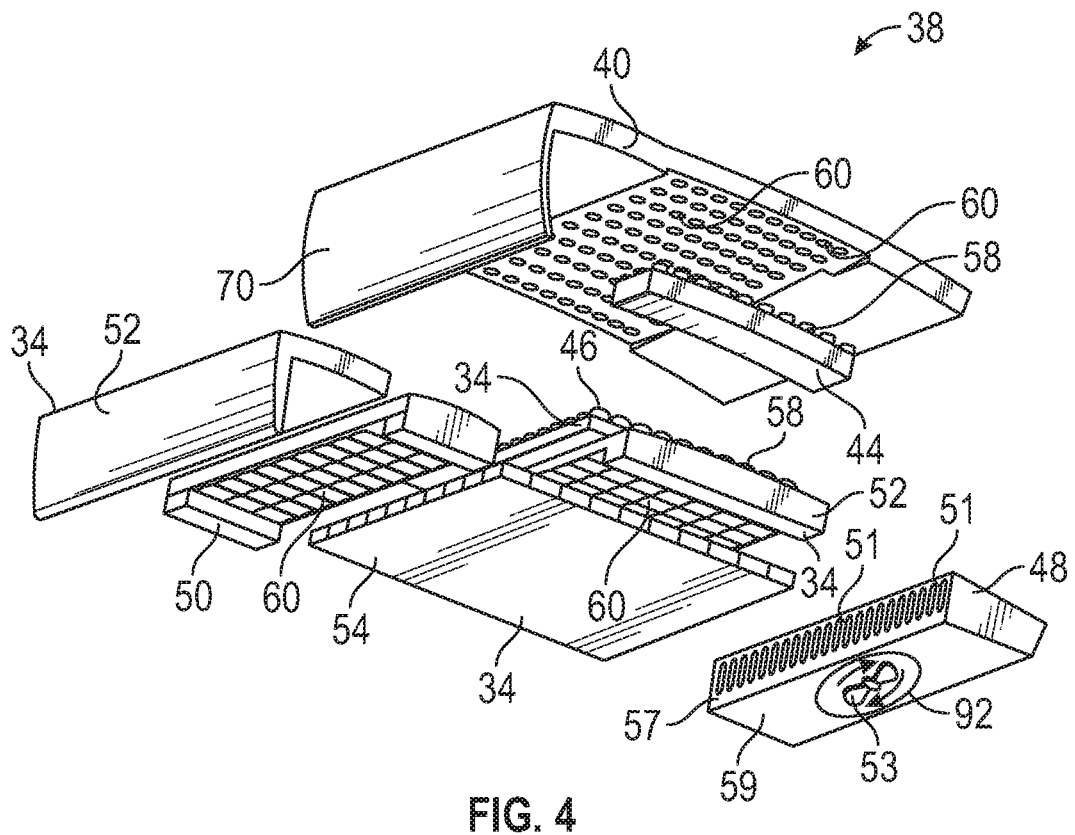
FIG. 4 illustrates an exploded perspective view from below of the modular foam arrangement of FIG. 3.
Figure 5:
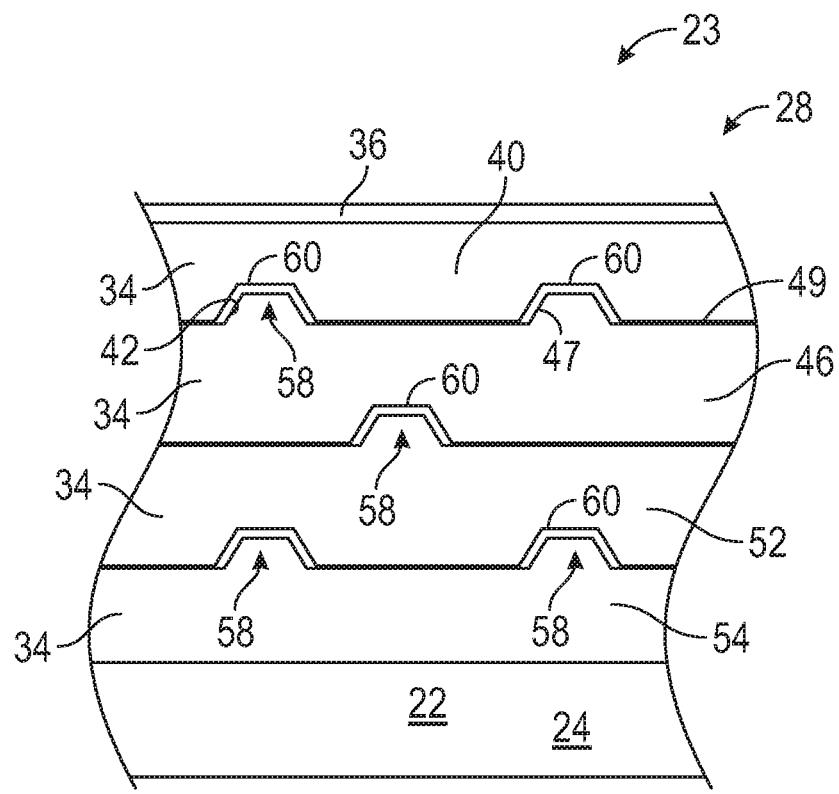
FIG. 5 illustrates a sectional view of a portion of a seat cushion in accordance with an exemplary embodiment.

FIG. 1 illustrates a perspective view of a seat assembly 10 in accordance with an exemplary embodiment. FIG. 2 is a side view of a portion of the seat assembly 10 depicted in FIG. 1. Referring to FIGS. 1-2, the seat assembly 10 has a seat base portion 18 and a seat backrest portion 20 that extends substantially upright from the seat base portion 18. In one example, the seat backrest portion 20 is fixedly coupled to the seat base portion 18 such that the seat backrest portion 20 is permanently set in a substantially upright configuration. In another example, the seat assembly 10 is an adjustable seat assembly in which the seat backrest portion 20 is pivotably coupled to the seat base portion 18 for movement between a substantially upright position and, for example, a substantially reclined and/or inclined (e.g., forward leaning) position(s).

As illustrated, the seat assembly 10 includes a seat frame 22 for supporting the seat assembly 10 including supporting armrest portions 16 and a plurality of seat cushions 23. The seat frame 22 is formed of a relatively rigid support material such as metal, e.g., aluminum or the like, composite, or any other frame structure material(s) known to those skilled in the art.

The seat frame 22 includes a seat base structure portion 24 and a seat backrest structure portion 26 that is operatively coupled (e.g., fixedly coupled or pivotably coupled) to the seat base structure portion 24 to extend in a substantially upright position from the seat base structure portion 24. The seat base structure portion 24 of the seat frame 22 supports a seat base cushion 28 (e.g., one of the seat cushions 23) that together form at least part of the seat base portion 18 of the seat assembly 10. Likewise, the seat backrest structure portion 26 of the seat frame 22 supports a seat backrest cushion 30 (e.g., another of the seat cushions 23) that together form at least part of the seat backrest portion 20 of the seat assembly 10. Various other trim and/or shell panels or components 31 may be directly or indirectly coupled to the seat frame 22 to form any remaining parts or sections of the seat base portion 18 and/or the seat backrest portion 20 of the seat assembly 10.

As will be discussed in further detail below, the seat base and backrest cushions 28 and 30 are each formed of relatively flexible and/or soft materials such as a foam material(s) 34 that is covered or at least partially covered with an outer covering 36. The outer covering 36 is a relatively flexible and/or soft skin material such as leather, cloth or textile fabric (e.g., woven or knitted construction), thermoplastic skin material such as TPO, PVC, or the like. The outer covering 36 may be formed using a conventional leather forming process, a thermoforming process, a slush or rotational molding process, and/or any other conventional process for forming an interior trim outer skin covering that is relatively flexible and/or soft.

Referring to FIGS. 1-4, in an exemplary embodiment, the foam material(s) 34 in the seat base cushion 28 is configured as multiple modular pieces or modular foam sections 40, 42, 44, 46, 50, 52, 54, and 56 that are coupled together to form a modular foam arrangement 38. As illustrated, the modular foam section 40 is an exterior modular foam section disposed along an outer-most portion of the modular foam arrangement 38 adjacent to and underlying the outer covering 36. The modular foam section 40 extends from a rearward section 66 of the seat base portion 18, which lies under the seat backrest portion 20, generally forward to a forward section 68 of the seat base portion 18. The modular foam section 40 has a down-standing flange 70 that wraps around the forward section 68 immediately adjacent to the outer covering 36. As such, the modular foam section 40 forms a portion of the modular foam arrangement 38 of the seat base cushion 28 that is disposed most proximate to a seat occupant immediately adjacent to the outer covering 36.

The remaining modular foam sections 42, 44, 46, 50, 52, 54, and 56 are interior modular foam sections that are disposed in the interior portion of the modular foam arrangement 38 underneath the modular foam section 40. As illustrated, the modular foam sections 42, 44, 46, 50, and 56 are disposed immediately adjacent to the modular foam section 40 along a side opposite the outer covering 36, while the modular foam sections 52 and 54 are spaced apart from the modular foam section 40 in a further interior portion of the modular foam arrangement 38.

In an exemplary embodiment, interior surfaces 47 are disposed within the modular foam arrangement 38, for example, along one or more of the interfaces 74, 76, 78, 80, 82, and 84 between the adjacent modular foam sections 40, 42, 44, 46, 50, 52, 54, and 56. As illustrated and as will be discussed in further detail below, at least part of the interior surfaces 47 are correspondingly arranged along the opposing outer interior surfaces of the modular foam section 40 and the modular foam section 46 that are separated by an air space 49 (e.g., space containing air) and that define the interface 74.

The modular foam arrangement 38 includes a venting modular section 48 that is in fluid communication with the interior surfaces 47 including the air space 49. An air movement device 53 is in fluid communication with the venting modular section 48 for advancing air between the interior surfaces 47 and the air movement device 53. In an exemplary embodiment, heat from a seat occupant or otherwise transfers from an upper portion of the seat base cushion 28 (e.g. proximate the outer covering 36) through the modular foam arrangement 38 to the interior surfaces 47. The air movement device 53 draws air, for example, through the air space 49 towards the venting modular section 48 to efficiently remove heat from the interior surfaces 47 via forced air convection to help keep the seat base cushion 28 at a comfortable temperature.

As illustrated, the venting modular section 48 includes a plurality of vents 51 configured to allow air flow through the venting modular section 48 to the air movement device 53. The venting modular section 48 is disposed in the rearward section 66 of the seat base portion 18 beneath the seat backrest portion 20. In an exemplary embodiment, the air movement device 53 is arranged in the seat base cushion 28 in a chamber 61 formed in the venting modular section 48 proximate a bottom-facing wall 59 that is adjacent to the seat frame 22. The vents 51 extend from a forward-facing wall 57 of the venting modular section 48 to the chamber 61 to provide fluid communication to the air movement device 53. As such, warm air drawn from the interior surfaces 47 of the modular foam arrangement 38 to the air movement device 53 can be exhausted into the open space(s) formed in the seat frame 22 proximate the rearward section 66 of the seat base portion 18.

In an exemplary embodiment, the venting modular section 48 is a venting modular foam section formed of the foam material 34. Alternatively, the venting modular section 48 may be formed of another material, for example, a plastic molded material or the like.

In an exemplary embodiment, the air movement device 53 is a fan, for example, that produces relatively little audible noise. Alternatively, the air movement device 53 may be configured as an air pump or any other device for moving air to produce forced air convection known to those skilled in the art.

Referring to FIG. 2, in an exemplary embodiment, the seat assembly 10 further includes a sensor 90 (e.g., infrared sensor, infrared camera, thermocouple or the like) configured to monitor a temperature that is associated with the seat assembly 10. For example, the sensor 90 may be in infrared camera that is positioned outside of the seat assembly 10 to monitor the temperature of a seat occupant, and/or one or both of the seat cushions 23. Alternatively, the sensor 90 may be positioned in one of the seat cushions 23, such as, for example, in the modular foam arrangement 38 to monitor the temperature of the seat cushion 23.

In an exemplary embodiment, the sensor 90 is operatively coupled to the air movement device 53 for turning the air movement device 53 "on" for moving air and for turning the air movement device 53 "off" to stop moving air. As illustrated, the sensor 90 is operatively coupled to the air movement device 53 via a controller 91, and lines 92 and 94. In an exemplary embodiment, the sensor 90 communicates a temperature associated with the seat assembly 10 to the controller 91 via line 94. If the temperature is at or above a first predetermined temperature, the controller 91 sends a signal to the air movement device 53 to turn "on" via line 92. If the temperature associated with the seat assembly 10 is at or below a second predetermined temperature that is less than the first predetermined temperature, the controller 91 sends a signal to the air movement device 53 to turn "off" via line 92. In an exemplary embodiment, the first predetermined temperature is from about 26 to about 30° C., and the second predetermined temperature is from about 22 to about 25.5° C.

Referring to FIGS. 1-5, at least some of the modular foam sections 40, 42, 44, 46, 50, 52, and 54 correspondingly have interlocking features 58 and 60 that engage the interlocking features 58 and 60 of one or more of the other adjacent modular foam sections 40, 42, 44, 46, 50, 52, and 54 for coupling the modular foam sections 40, 42, 44, 46, 50, 52, and 54 together. In an exemplary embodiment, the interlocking features 60 are negative features such as recesses or holes, and the interlocking features 58 are positive features such as projections or bosses that engage with the negative features. In one example, the interlocking features 58 can independently be configured as a boss having a substantially cylindrical-shape, and the interlocking features 60 can independently be configured as a hole having a substantially cylindrical shape for receiving and engaging the interlocking features 58. In another example, the interlocking features 58 can independently be configured as a boss having a substantially polygonal box-shape, and the interlocking features 60 can independently be configured as a hole having a substantially polygonal shape for receiving and engaging the interlocking features 58.

In an exemplary embodiment, the outer surfaces of the positive features or interlocking features 58 that extend from the modular foam section 46 towards the modular foam section 40 form at least part of the interior surfaces 47. In particular, the interlocking features 58 of the modular foam section 46 are in contact with and at least partially disposed in the negative features or interlocking features 60 of the modular foam section 40. As illustrated, at least a portion of the outer surface of the interlocking features 58 of the modular foam section 46 are exposed in the air space 49. As such, when the air movement device 53 is operating, air advances through the air space 49 along the outer surfaces of the interlocking features 58 of the modular foam section 46 to efficiently remove heat from both the modular foam sections 40 and 46 via forced air convection.

The modular foam arrangement 38 may include one or more channels 96 formed therein. As illustrated, the channels 96 are formed in the modular foam section 50 towards the forward section 68 of the seat base cushion 28. The channels 96 are in fluid communication with the interior surfaces 47 to facilitate transferring heat from the seat base cushion 28 to air advancing through the channels 96 and back towards the venting modular section 48. In an exemplary embodiment, the channels 96 help draw heat from the upper portion of the seat base cushion 28 towards the walls of the channels 96 in the interior of the modular foam arrangement 38. In addition to the walls of the channels 96 forming part of the interior surfaces 47, the channels 96 further help direct the advancing air downstream to remove additional heat from other areas of the interior surfaces 47.

The modular foam sections 40, 42, 44, 46, 50, 52, 54, and 56 and the venting modular section 48 may be formed from the same type of foam or different types of foam. For example, one or more of the modular foam sections 40, 42, 44, 46, 50, 52, 54, and 56 and the venting modular section 48 may be formed from a thermoset type material (e.g., polyurethane or polyurea type foam material) based on conventional foam forming techniques of reacting two or more components, such as, for example, by reacting polyols with diisocynates in the presence of a foaming agent. Alternatively, one or more of the 40, 42, 44, 46, 50, 52, 54, and 56 and the venting modular section 48 may be formed from a thermoplastic material (e.g., polyolefin type foam) based on conventional foam forming techniques of foaming thermoplastic materials, such, as, for example, by saturating a thermoplastic material with liquid nitrogen and decompressing the liquid nitrogen saturated-thermoplastic material in an autoclave to form a thermoplastic foam.

The modular foam sections 40, 42, 44, 46, 50, 52, 54, and 56 and the venting modular section 48 may be fabricated by initially forming one or more foam blocks using one or more conventional foam forming processes, such as those discussed above or by any other foam forming process known to those skilled in the art. In an exemplary embodiment, the one or more foam blocks are then cut, milled, and/or otherwise trimmed using a computer numerical control (CNC) process to form, for example, the intricate shapes that define the modular foam sections 40, 42, 44, 46, 50, 52, 54, and 56 and the venting modular section 48 including the corresponding interlocking features 58 and 60, the vents 51, and/or the chamber 61.

In an exemplary embodiment, the venting modular section 48 is affixed to the adjacent modular foam sections 40, 46, 52, and 54 with an adhesive 72. As illustrated, no adhesive or substantially no adhesive (e.g., substantially free of adhesive) is present between the interfaces 74, 76, 80, 82, and 84 between the adjacent modular foam sections 40, 42, 44, 46, 50, and 54, thereby reducing the amount of adhesive used in the modular foam arrangement 38 as compared to conventional seat cushions.

Referring to FIG. 2, the foam material(s) 34 in the seat backrest cushion 30 may be configured with multiple modular pieces, or alternatively, may be formed of a single piece of foam or multiple pieces of foam that are affixed together with an adhesive. In an exemplary embodiment, the seat backrest cushion 30 includes a modular foam arrangement similar configured to the modular foam arrangement 38 as discussed above in relation to the seat base cushion 28.

Figure 6:
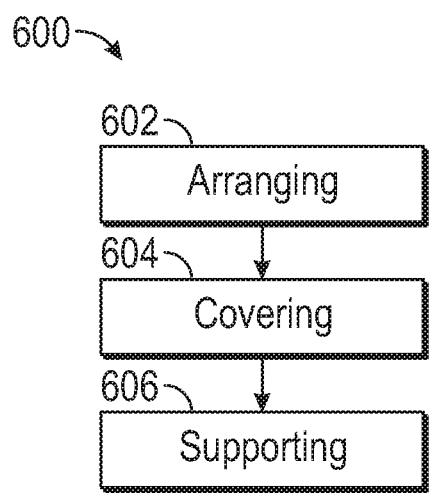
FIG. 6 illustrates a method for fabricating a seat assembly in accordance with an exemplary embodiment.

Referring to FIG. 6, a method 600 for fabricating a seat assembly is provided. The method 600 includes arranging (STEP 602) a venting modular section in fluid communication with an internal surface in a modular foam arrangement. The modular foam arrangement is at least partially covered (STEP 604) with an outer covering for forming a seat cushion. The seat cushion is supported (STEP 606) by a seat frame.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A seat assembly comprising: a seat frame; a seat cushion supported by the seat frame and comprising: a modular foam arrangement having an interior surface disposed therein, the modular foam arrangement comprising a venting modular section in fluid communication with the interior surface, wherein the venting modular section has a chamber formed therein and a plurality of vents in fluid communication with the chamber; and an outer covering that at least partially covers the modular foam arrangement; and an air movement device in fluid communication with the venting modular section for advancing air between the interior surface and the air movement device, wherein the air movement device is disposed in the chamber of the venting modular section and draws air from about the interior surface through the vents to the air movement device for removing heat from the seat cushion, wherein the venting modular section is a venting modular foam section comprising a foam material.

2. The seat assembly of claim 1, wherein the venting modular section has a plurality of vents formed therein for allowing air flow between the interior surface and the air movement device.

3. The seat assembly of claim 1, wherein the air movement device is disposed in the seat cushion, between the seat frame and the outer covering.

4. The seat assembly of claim 3, wherein the air movement device is disposed in the venting modular section.

5. The seat assembly of claim 1, wherein the air movement device is a fan.

6. The seat assembly of claim 1, wherein the seat cushion is a seat base cushion.

7. The seat assembly of claim 1, wherein the seat cushion is a seat backrest cushion.

8. The seat assembly of claim 1, wherein the modular foam arrangement comprises a first modular foam section and a second modular foam section disposed adjacent to the first modular foam section, and wherein at least one of the first modular foam section and the second modular foam section comprises at least part of the interior surface.

9. The seat assembly of claim 8, wherein the second modular foam section has a positive feature extending therefrom, and wherein the positive feature has an outer surface comprising the at least part of the interior surface.

10. The seat assembly of claim 9, wherein the positive feature extends from the second modular foam section to the first modular foam section.

11. The seat assembly of claim 10, wherein an air space is formed about the positive feature between the first and second modular foam sections, and wherein the air movement device is in fluid communication with the air space to allow air to advance about the positive feature and towards the venting modular section.

12. The seat assembly of claim 10, wherein the first modular foam section has a negative feature, and wherein the positive feature of the second modular foam section is at least partially disposed in the negative feature.

13. The seat assembly of claim 12, wherein the negative and positive features are interlocking features that are engaged to couple the first and second modular foam sections together.

14. The seat assembly of claim 1, wherein the modular foam arrangement has a channel formed therein in fluid communication with the interior surface to facilitate transferring heat from the seat cushion to air advancing towards the venting modular section.

15. The seat assembly of claim 1, further comprising a sensor configured to monitor a temperature that is associated with the seat assembly, and wherein the sensor is operatively coupled to the air movement device for turning the air movement device on at a first predetermined temperature and for turning the air movement device off at a second predetermined temperature that is less than the first predetermined temperature.

16. A seat assembly comprising: a seat base portion having a rearward section and a forward section on a side opposite the rearward section, the seat base portion comprising a seat base structure portion and a seat base cushion supported by the seat base structure portion, wherein the seat base cushion comprises: a modular foam arrangement having an interior surface disposed therein generally forward of the rearward section of the seat base portion, the modular foam arrangement comprising a venting modular section in fluid communication with the interior surface, wherein the venting modular section has a chamber formed therein and a plurality of vents in fluid communication with the chamber; and an outer covering that at least partially covers the modular foam arrangement; an air movement device in fluid communication with the venting modular section for advancing air between the interior surface and the air movement device, wherein the air movement device is disposed in the chamber of the venting modular section and draws air from about the interior surface through the vents to the air movement device for removing heat from the seat cushion; and a seat backrest portion coupled to the seat base portion and configured to extend substantially upright from the rearward section of the seat base portion, wherein the venting modular section is a venting modular foam section comprising a foam material.

17. The seat assembly of claim 16, wherein the venting modular section is disposed in the rearward section of the seat base portion beneath the seat backrest portion, between a seat frame and the outer covering.

18. The seat assembly of claim 16, wherein the modular foam arrangement has a channel formed therein generally forward of the rearward section of the seat base portion and in fluid communication with the interior surface to facilitate transferring heat from the seat base cushion to air advancing towards the venting modular section.

19. A method for fabricating a seat assembly, the method comprising the steps of arranging a venting modular section in fluid communication with an internal surface in a modular foam arrangement, wherein the venting modular section has a chamber formed therein and a plurality of vents in fluid communication with the chamber; at least partially covering the modular foam arrangement with an outer covering for forming a seat cushion; supporting the seat cushion by a seat frame, and arranging an air movement device in fluid communication with the venting modular section for advancing air between the interior surface and the air movement device, wherein the air movement device is disposed in the chamber of the venting modular section and draws air from about the interior surface through the vents to the air movement device for removing heat from the seat cushion, wherein the venting modular section is a venting modular foam section comprising a foam material.

* * * * *